US009152938B2

(12) United States Patent
Lang et al.

(10) Patent No.: US 9,152,938 B2
(45) Date of Patent: Oct. 6, 2015

(54) AGRICULTURAL MACHINE AND OPERATOR PERFORMANCE INFORMATION SYSTEMS AND RELATED METHODS

(75) Inventors: Jay Lang, Leawood, KS (US); William C. Mayes, Lenexa, KS (US); Landon Morris, Olathe, KS (US)

(73) Assignee: FARMLINK LLC, Kansas City, MO (US)

( * ) Notice: Subject to any disclaimer, the term of this patent is extended or adjusted under 35 U.S.C. 154(b) by 1210 days.

(21) Appl. No.: 12/539,376

(22) Filed: Aug. 11, 2009

(65) Prior Publication Data

US 2010/0036696 A1 Feb. 11, 2010

Related U.S. Application Data

(60) Provisional application No. 61/188,562, filed on Aug. 11, 2008.

(51) Int. Cl.
*G06Q 10/06* (2012.01)
*A01D 41/127* (2006.01)
*A01B 79/00* (2006.01)

(52) U.S. Cl.
CPC ........ *G06Q 10/06393* (2013.01); *A01B 79/005* (2013.01); *A01D 41/127* (2013.01); *G06Q 10/0637* (2013.01); *G06Q 10/06375* (2013.01)

(58) Field of Classification Search
USPC ....................................... 705/7.36, 7.37, 7.39
See application file for complete search history.

(56) References Cited

U.S. PATENT DOCUMENTS

| 5,712,782 | A | | 1/1998 | Weigelt et al. |
| 5,870,689 | A | * | 2/1999 | Hale et al. .......................... 702/5 |
| 6,002,984 | A | | 12/1999 | Aughenbaugh |
| 6,016,713 | A | * | 1/2000 | Hale ........................... 73/864.45 |
| 6,070,673 | A | * | 6/2000 | Wendte .............................. 172/2 |
| 6,141,614 | A | | 10/2000 | Janzen et al. |
| 6,327,569 | B1 | | 12/2001 | Reep |
| 6,469,628 | B1 | | 10/2002 | Richards et al. |
| 6,490,524 | B1 | | 12/2002 | White et al. |
| 6,591,145 | B1 | | 7/2003 | Hoskinson et al. |
| 6,611,201 | B1 | | 8/2003 | Bishop et al. |
| 6,671,698 | B2 | | 12/2003 | Pickett et al. |

(Continued)

OTHER PUBLICATIONS

Galan, Carmen, Vazquez, Luis, Garcia-Mozo, Herminia and Dominguez, Eugenio."Forecasting Olive (*Olea europaea*) Crop Yield based on Pollen Emission," Science Direct, Field Crops Research 86 (2004) 43-51).*

(Continued)

*Primary Examiner* — Beth V Boswell
*Assistant Examiner* — Renae Feacher
(74) *Attorney, Agent, or Firm* — Bryan Cave LLP (57) ABSTRACT

In one example, a system can comprise a first data gathering mechanism set and a data processing mechanism set. The a first data gathering mechanism set can be configured to gather a first operational data set during operation of a first agricultural machine set, and to transmit the first operational data set to a network. The first operational data set can comprise information representative of one or more characteristics of an agricultural crop during production. The a data processing mechanism can be configured to store a combined data set comprising the first operational data set, and generate one or more reports based on the combined data set. Other embodiments and related methods are also disclosed herein.

21 Claims, 5 Drawing Sheets

(56) References Cited

U.S. PATENT DOCUMENTS

| | | |
|---|---|---|
| 6,677,854 B2 | 1/2004 | Dix |
| 6,687,616 B1 | 2/2004 | Peterson et al. |
| 6,691,135 B2 | 2/2004 | Pickett et al. |
| 6,845,326 B1 | 1/2005 | Panigrahi et al. |
| 6,851,662 B2 | 2/2005 | Panigrahi et al. |
| 6,937,939 B1 | 8/2005 | Shibusawa et al. |
| 6,941,208 B2 | 9/2005 | Mahoney et al. |
| 6,963,881 B2 | 11/2005 | Pickett et al. |
| 6,990,459 B2 | 1/2006 | Schneider |
| 7,032,816 B2 | 4/2006 | Markham et al. |
| 7,047,220 B2 | 5/2006 | Taguchi et al. |
| 7,050,910 B2 | 5/2006 | Kleemola et al. |
| 7,062,513 B2 | 6/2006 | Beck et al. |
| 7,080,034 B1 | 7/2006 | Reams |
| 7,085,777 B2 | 8/2006 | Beck et al. |
| 7,113,839 B2 | 9/2006 | Ferguson et al. |
| 7,194,413 B2 | 3/2007 | Mahoney et al. |
| 7,222,051 B2 | 5/2007 | Shibata et al. |
| 7,280,898 B2 | 10/2007 | Lesesky et al. |
| 7,313,467 B2 | 12/2007 | Breed et al. |
| 7,321,310 B2 | 1/2008 | Curkendall et al. |
| 7,397,392 B2 | 7/2008 | Mahoney et al. |
| 7,415,333 B2 | 8/2008 | Anderson |
| 7,440,901 B1 * | 10/2008 | Dlott et al. .................... 705/346 |
| 7,516,244 B2 | 4/2009 | Kelly et al. |
| 7,630,802 B2 | 12/2009 | Breed |
| 7,650,210 B2 | 1/2010 | Breed |
| 7,702,597 B2 * | 4/2010 | Singh et al. .................... 706/21 |
| 2002/0103688 A1 * | 8/2002 | Schneider .................... 705/8 |
| 2003/0182144 A1 | 9/2003 | Pickett et al. |
| 2003/0182260 A1 * | 9/2003 | Pickett et al. .................... 707/1 |
| 2004/0024603 A1 * | 2/2004 | Mahoney et al. .................... 704/277 |
| 2004/0194442 A1 * | 10/2004 | Maertens .................... 56/10.2 R |
| 2005/0085973 A1 * | 4/2005 | Furem et al. .................... 701/50 |
| 2005/0096849 A1 | 5/2005 | Sorrells |
| 2006/0074560 A1 * | 4/2006 | Dyer et al. .................... 702/5 |
| 2006/0187048 A1 | 8/2006 | Curkendall et al. |
| 2006/0190494 A1 | 8/2006 | Beck et al. |
| 2006/0271262 A1 * | 11/2006 | McLain, III .................... 701/50 |
| 2006/0271555 A1 | 11/2006 | Beck et al. |
| 2006/0282467 A1 * | 12/2006 | Peterson et al. .................... 707/104.1 |
| 2007/0089390 A1 * | 4/2007 | Hendrickson et al. .................... 56/10.2 F |
| 2007/0093925 A1 * | 4/2007 | Moughler .................... 700/108 |
| 2007/0239337 A1 * | 10/2007 | Anderson .................... 701/50 |
| 2008/0030348 A1 * | 2/2008 | Pape et al. .................... 340/573.3 |
| 2009/0198422 A1 * | 8/2009 | Vik et al. .................... 701/50 |

OTHER PUBLICATIONS

"Chapter V Price-Forecasting Equation Estimation," <http://yosemite.epa.gov/ee/epa/eerm.nsf/vwAN/Ee0271c-3.pdf/$file/Ee0271c-3.pdf>, Jun. 30, 1997.*

"Understanding USDA Crop Forecasts," USDA, Misc. Publication No. 1554, Mar. 1999.*

Nowatzki, John; Hoffman, Vern; Disrud, Lowell and Nelson, Kraig, GPS Applications in Crop Production, Apr. 27, 2004.*

Sun, Jiulin,"Dynamic Monitoring and Yield Estimation of Crops by Mainly Using the Remote Sensing Technique in China," Photogrammetric Engineering & Remote Sensing, vol. 66, No. 5, May 2000, pp. 645-650.*

"Machinery: Crop Sensor Benefits," Farmers Guardian, Briefing Media Ltd., Jun. 16, 2006.*

International Search Report for Application No. PCT/US2010/039711, dated Aug. 19, 2010.

* cited by examiner

FIG. 5

AGRICULTURAL MACHINE AND OPERATOR PERFORMANCE INFORMATION SYSTEMS AND RELATED METHODS

CLAIM OF PRIORITY

This application is a non-provisional patent application claiming priority to U.S. Provisional Patent Application No. 61/188,562, filed on Aug. 11, 2008, which is incorporated herein by reference.

TECHNICAL FIELD

This disclosure relates generally to information systems, and relates more particularly to agricultural machine and operator performance information systems and related methods.

BACKGROUND

With the continued mechanization of the agricultural industry, it has become possible to gather crop production data from the machines used in production agriculture. Such data, however, is normally visible or available only to the entity that collects it, whether the entity is a farmer or an organization operating the agricultural machines. As a result, the data cannot be gathered and/or aggregated either to estimate or predict its effects at macro scale levels, and/or to benchmark performance of localized agricultural operations. For the same reasons, the estimations, predictions, and benchmarking described above cannot be presently carried out in real time.

Accordingly, a need exists for a system, process, and/or method that allows real time gathering, aggregation, and/or benchmarking of agricultural data to overcome at least the limitations described above.

For simplicity and clarity of illustration, the drawing figures illustrate the general manner of construction, and descriptions and details of well-known features and techniques may be omitted to avoid unnecessarily obscuring the invention. Additionally, elements in the drawing figures are not necessarily drawn to scale. For example, the dimensions of some of the elements in the figures may be exaggerated relative to other elements to help improve understanding of embodiments of the present invention. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the invention described herein are, for example, capable of operation in other orientations than those illustrated or otherwise described herein.

The terms "couple," "coupled," "couples," "coupling," and the like should be broadly understood and refer to connecting two or more elements or signals, electrically, mechanically and/or otherwise. Two or more electrical elements may be electrically coupled together but not be mechanically or otherwise coupled together; two or more mechanical elements may be mechanically coupled together, but not be electrically or otherwise coupled together; two or more electrical elements may be mechanically coupled together, but not be electrically or otherwise coupled together. Coupling may be for any length of time, e.g., permanent or semi-permanent or only for an instant.

An electrical "coupling" and the like should be broadly understood and include coupling involving any electrical signal, whether a power signal, a data signal, and/or other types or combinations of electrical signals. A mechanical "coupling" and the like should be broadly understood and include mechanical coupling of all types. The absence of the word "removably," "removable," and the like near the word "coupled," and the like does not mean that the coupling, etc. in question is or is not removable.

The term "real time" is defined with respect to operations carried out as soon as practically possible upon occurrence of a triggering event. A triggering event can comprise receipt of data necessary to execute a task or to otherwise process information. Because of delays inherent in transmission and/or in computing speeds, the term "real time" encompasses operations that occur in "near" real time or somewhat delayed from a triggering event.

DETAILED DESCRIPTION

In one example, a system can comprise a first data gathering mechanism set and a data processing mechanism set. The first data gathering mechanism set can be configured to gather a first operational data set during operation of a first agricultural machine set, and to transmit the first operational data set to a network. The first operational data set can comprise information representative of one or more characteristics of an agricultural crop during production. The data processing mechanism can be configured to store a combined data set comprising the first operational data set, and generate one or more reports based on the combined data set.

Figure 1:
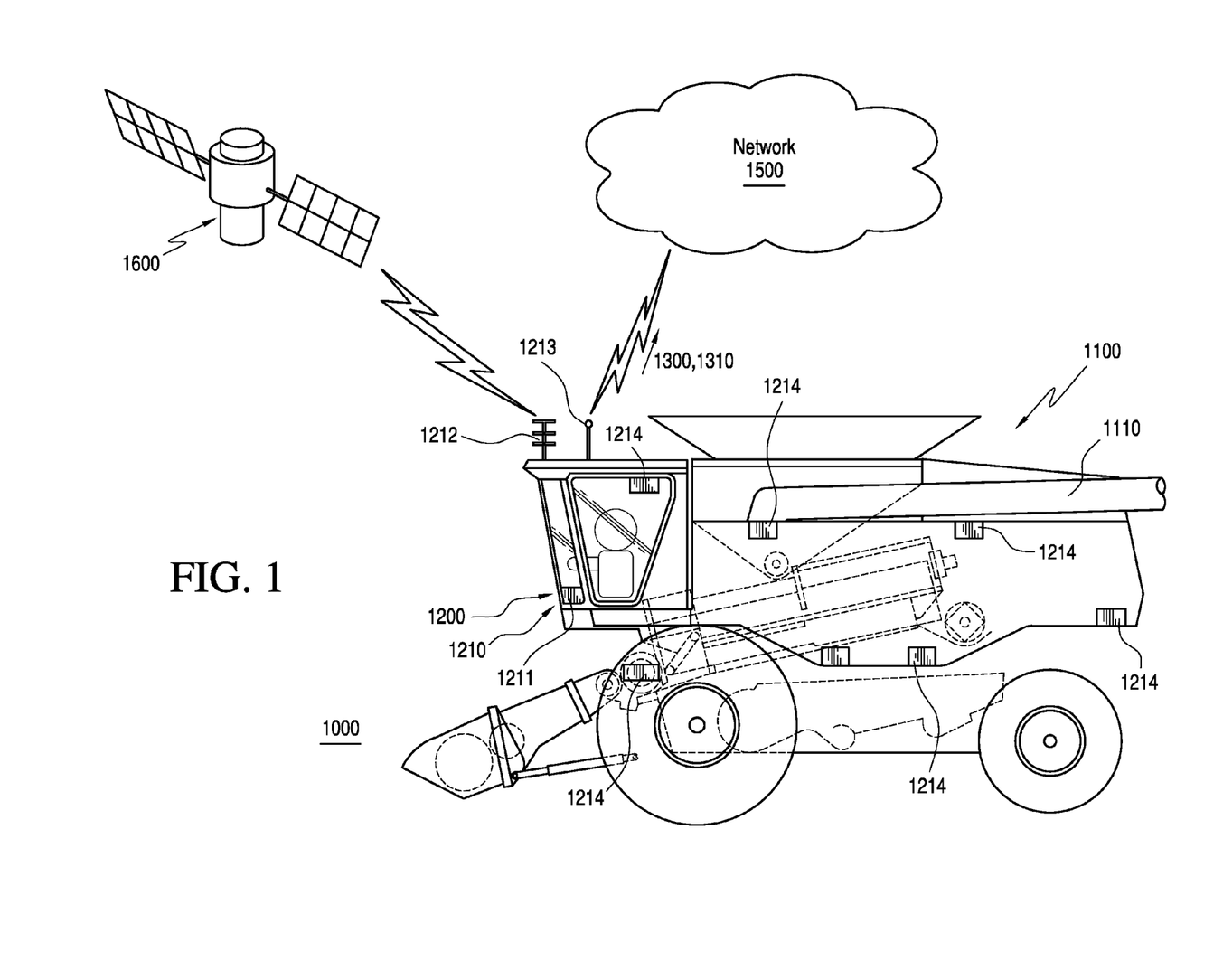
FIG. 1 illustrates a diagram of a first data gathering mechanism coupled to a first agricultural machine as part of a system for generating agricultural data reports, such as operational, mechanical, or production data reports.

Referring now to the figures, FIG. 1 illustrates a diagram of agricultural machine 1110 as part of agricultural machine set 1100 of system 1000. In the present example, system 1000 can represent a system for collecting, aggregating, processing, and/or transmitting information about agricultural machine set 1100 during one or more operations related to the production of agricultural crops. In some examples, the information about agricultural machine set can relate to operating parameters (e.g., rotor speed, concave settings, ground speed), mechanical parameters (e.g., oil temperature, fluid pressure, fuel consumption), and/or production parameters (e.g., yield and/or moisture of crops). Agricultural machine 1110 is presented herein as a combined harvester and thresher ("combine") for harvesting crops in the present example, although in other examples agricultural machine 1110 could comprise other types of agricultural machines or equipment, including other equipment used to harvest crops, such as forage harvesters, cotton harvesters, and/or cane harvesters.

Agricultural machine 1110 is shown coupled to data gathering mechanism 1210 in the present example, where data gathering mechanism 1210 forms part of data gathering mechanism set 1200. Data gathering mechanism 1210 is configured to gather operational data 1310 during operation of agricultural machine 1110, and to transmit operational data 1310 to network 1500 for storage and/or further processing.

In some embodiments, data gathering mechanism set 1200 can comprise further data gathering mechanisms similar to data gathering mechanism 1210 but coupled to other agricultural machines (not shown) of agricultural machine set 1100. In such examples, other operational data from such further data gathering mechanisms may also be sent to network 1500 along with operational data 1310 as part of operational data set 1300.

Data gathering mechanism 1210 comprises several components in the present example, such as GPS receiver 1212 configured to communicate with one or more GPS satellites 1600 and thereby determine, as part of operational data 1310, a geographical location of data gathering mechanism 1210 and/or of agricultural machine 1110. Data gathering mechanism 1210 also comprises operation monitor 1211 coupled to GPS receiver 1212 and to crop production sensors 1214 in the present example, where operation monitor 1211 is configured to gather, as part of operational data 1310, information about one or more parameters of agricultural machine 1110 via crop production sensors 1214 and/or GPS receiver 1212.

In some examples, the one or more parameters of agricultural machine 1110 can comprise operating parameters, mechanical parameters, and/or production parameters. As an example, the operating parameters for an agricultural machine can comprise information about geographical location, ground speed, feeder house speed, rotor speed, chopper speed, tailboard speed, fan speed, shoe settings (e.g., chaffer settings and/or sieve settings), tailings elevator settings, concave settings, header position, header specifications, header size, and/or operator settings, among others. In the same or other embodiments, the mechanical parameters for an agricultural machine can comprise information about engine performance, such as engine speed, engine hours, fuel pressure, horsepower percentage use, hydraulic pressure, hydraulic flow, battery voltage, fuel consumption, oil pressure, air inlet temperature, boost pressure, intake manifold temperature, separator hours, and/or engine temperature. The mechanical parameters can also comprise information about drivetrain performance, such as information about drivetrain stress, gearing, pressure, power-rear wheel assist engagement, and/or temperature. The production parameters can comprise information about, for example, yield, grain loss, and/or moisture of a crop being harvested.

In some embodiments, operation monitor 1211 can be also configured to gather information about harvesting from a specific location, such as a field, as the field is harvested by agricultural machine 1110. In the same or other embodiments, the information about the harvesting from the field can comprise one or more of a harvest field map, a harvest field area, a crop weight value, a yield value, a yield per unit of area, a moisture content, and/or a hillside compensation setting, among others.

Data gathering mechanism 1210 also comprises transmitter 1213 in the present example, where transmitter 1213 is coupled to at least one of operation monitor 1211 and/or GPS receiver 1212 and configured to transmit operational data 1310 to network 1500. Although transmitter 1213 couples with network 1500 via a cellular network configuration in the present example, other wireless standards, such as Wi-Fi, may also be supported in other examples. Transmitter 1213 can be configured to transmit operational data 1310 continuously to network 1500 during operation of agricultural machine 1110 as operational data 1310 is gathered by data gathering mechanism 1210. In other examples, transmitter 1213 can be configured to transmit operational data 1310 upon completion of an operating step or task during the operation of agricultural machine 1110. There can also be examples where data gathering mechanism 1210 can also comprise a receiver to wirelessly receive signals from network 1500, such as signals with instructions for data gathering mechanism 1210 to gather and/or transmit specific information related to the operation of agricultural machine 1110.

In the present embodiment, data gathering mechanism 1210 comprises commercial off the shelf (COTS) components communicatively coupled together to gather and transmit operational data 1310. For example, in one embodiment, operation monitor 1211 can comprise a Ceres 8000i yield monitor available from Loup Electronics of Lincoln, Nebr. In the same or a different embodiment, GPS receiver 1212 can comprise a Synpak E GPS receiver, available through Simple-ComTools of Indian Trail, N.C., and/or a GSynQ/T MK-1 Smart GPS Antenna, available from Synergy Systems, LLC of San Diego, Calif. In the same or other embodiments, transmitter 1213 can comprise a TC65T Wireless Module, available from Cinterion Wireless Modules of Munich, Germany.

Figure 2:
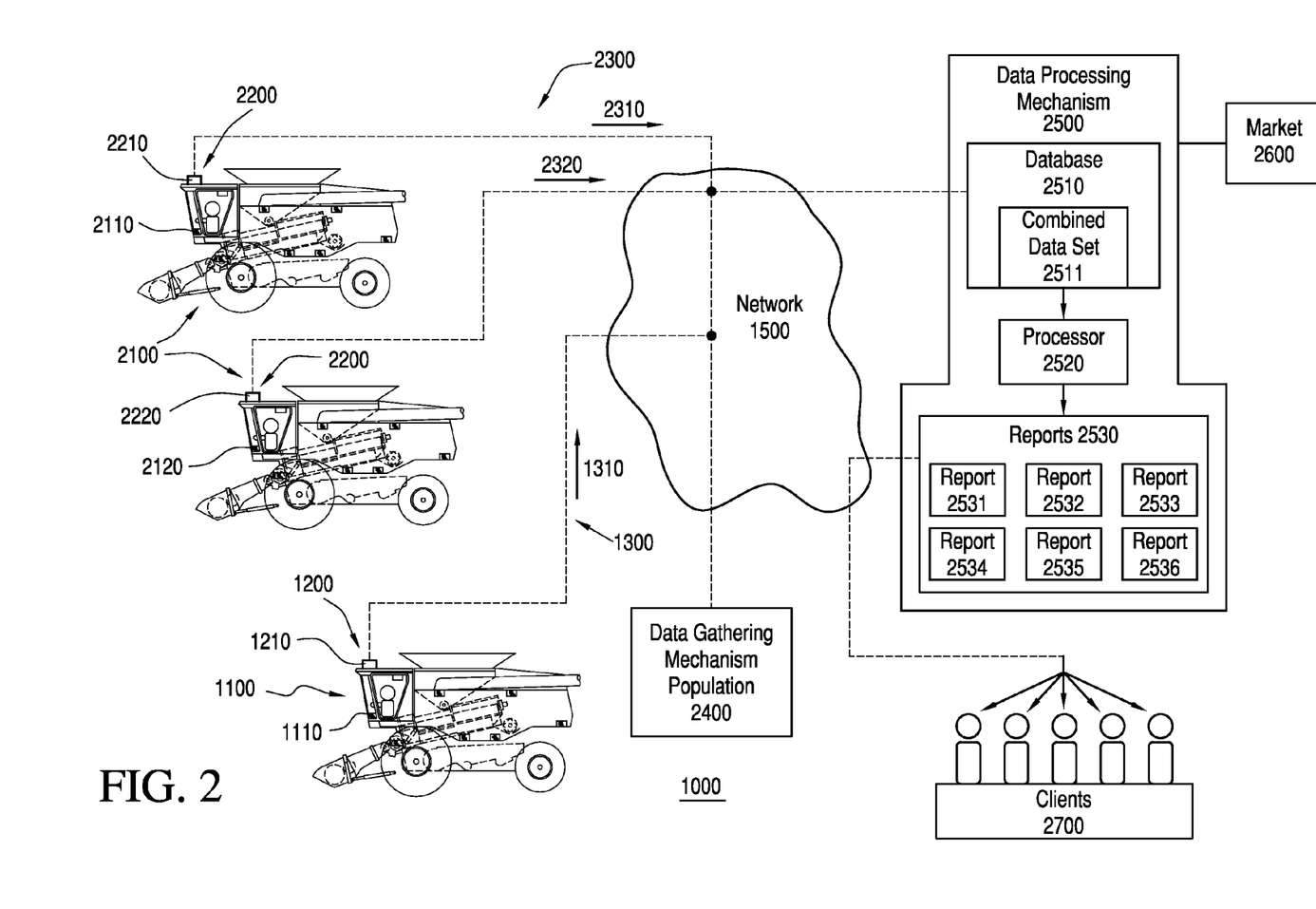
FIG. 2 illustrates a diagram of the system of FIG. 1, further comprising a data processing mechanism coupled to the first data gathering mechanism via a network.

Continuing with the figures, FIG. 2 illustrates a diagram of system 1000 comprising data processing mechanism 2500 coupled to data gathering mechanism 1210 via network 1500. Data gathering mechanism 1210 is still coupled to agricultural machine 1110 and to network 1500 as shown in FIG. 1, but FIG. 2 further illustrates that network 1500 can support other data gathering mechanism sets as coupled to other agricultural machine sets other than agricultural machine set 1100. For example, data gathering mechanism set 2200 is shown coupled to agricultural machine set 2100 to transmit operational data set 2300 to network 1500, similar to as described above for FIG. 1 with respect to data gathering mechanism set 1200 coupled to agricultural machine set 1100 to transmit operational data set 1300. In the same or other examples, network 1500 can comprise one or more interconnected networks and network interfaces. For example, data gathering mechanisms can couple with network 1500 via a cellular network interface, while data processing mechanism 2500 can couple to network 1500 via the internet.

As seen in FIG. 2, data processing mechanism is also coupled to clients 2700 via network 1500, where clients 2700 can comprise, for example, electronic terminals operated by subscribers or operators of data processing mechanism 2500 to request and/or access reports 2530. There can be examples where one or more of reports 2530 can comprise raw data made accessible to clients 2700, where the raw data may be based on, for example operational data sets 1300 and/or 2300.

In the same or other examples, data processing mechanism 2500 may generate one or more of reports 2530 after processing and/or applying computing algorithms to the raw data. Reports 2530 can be printed or delivered upon request and/or periodically to clients 2700. In the same or other examples, one or more or reports 2530 can be displayed at a screen of an electronic terminal of one or more of the clients 2700. There can also be examples where the one or more reports 2530 can be updated in real time, based on updates to data received by data processing mechanism 2500, such as when displayed on a screen as described above. Clients 2700 may couple to data processing mechanism 2500 via an internet connection through network 1500 in some examples.

In the same or other examples, data processing mechanism 2500 can be configured to control access to reports 2530 based on a user profile of specific ones of clients 2700. User profiles may be structured based on one or more subscription levels available for clients 2700 to access data processing mechanism 2500 and/or reports 2530. For example, a first one of clients 2700 may be given access only to certain reports of reports 2530, and/or only to reports generated using certain portions of data in data processing mechanism 2500. In the same or other examples, the access or delivery of reports 2530 may be established based on a preference set for a user profile. For example, a user profile may be set such that one or more of reports 2530 are accessible upon request and/or to such that one or more of reports 2530 are periodically "pushed" or delivered to one of clients 2700, such as via email. User profiles may comprise, in some examples, a username and password combination. Data processing mechanism may be configured to restrict access altogether when a user profile is unrecognized.

In the present example of FIG. 2, agricultural machine set 2100 comprises more than one agricultural machine, namely agricultural machines 2110 and 2120, coupled respectively to data gathering mechanisms 2210 and 2220 of data gathering mechanism set 2200 to respectively transmit operational data 2310 and 2320 to network 1500. There can be further examples where other data gathering mechanism sets and corresponding agricultural machine sets can also be connected to network 1500 as part of system 1000, whether such agricultural machine sets comprise only a single agricultural machine and a single data gathering mechanism, as for agricultural machine set 1100, or a plurality of agricultural machines and a plurality of data gathering mechanisms, as for agricultural machine set 2100. In the present example, such other data gathering mechanism sets can form part of data gathering mechanism population 2400.

Data processing mechanism 2500 is configured in FIG. 2 to communicate with data gathering mechanism sets 1200 and 2200 via network 1500, and comprises database 2510 and processor 2520. Database 2510 is configured to store combined data set 2511, where combined data set 2511 can be generated and/or organized by data processing mechanism 2500 based on operational data set 1300 from data gathering mechanism set 1200 and/or on operational data set 2300 from data gathering mechanism set 2200. Data processing mechanism 2500 also comprises processor 2520 to generate one or more reports 2530 based on combined data set 2511.

Figure 3:
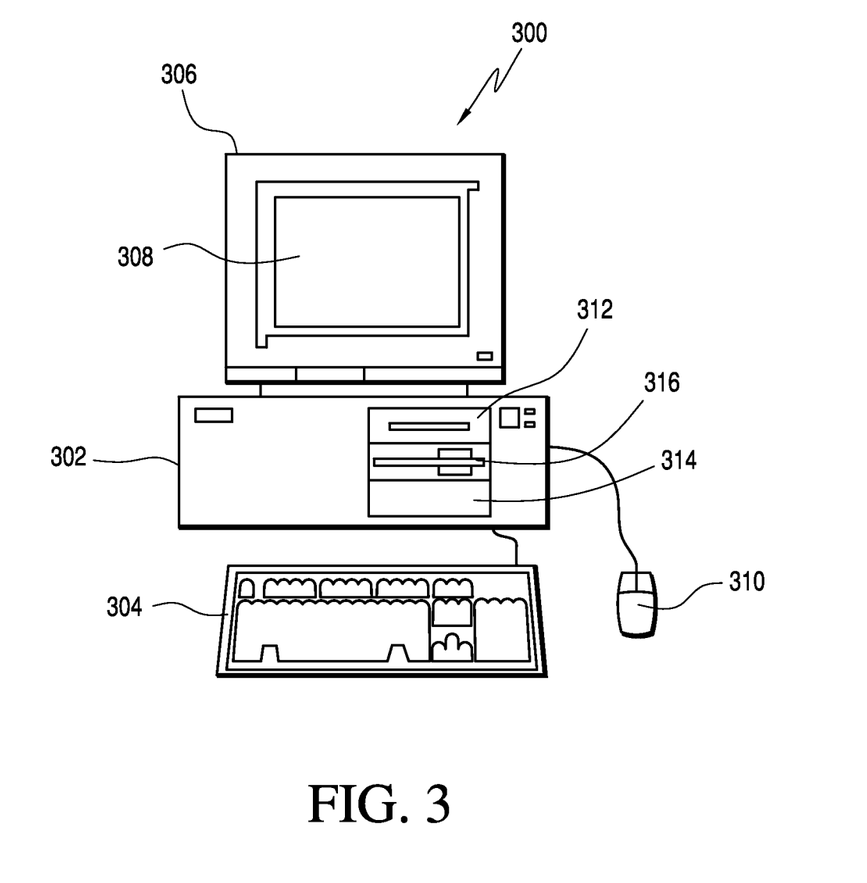
FIG. 3 illustrates a computer that can be suitable for implementing an embodiment of the data processing mechanism of FIG. 2.
Figure 4:
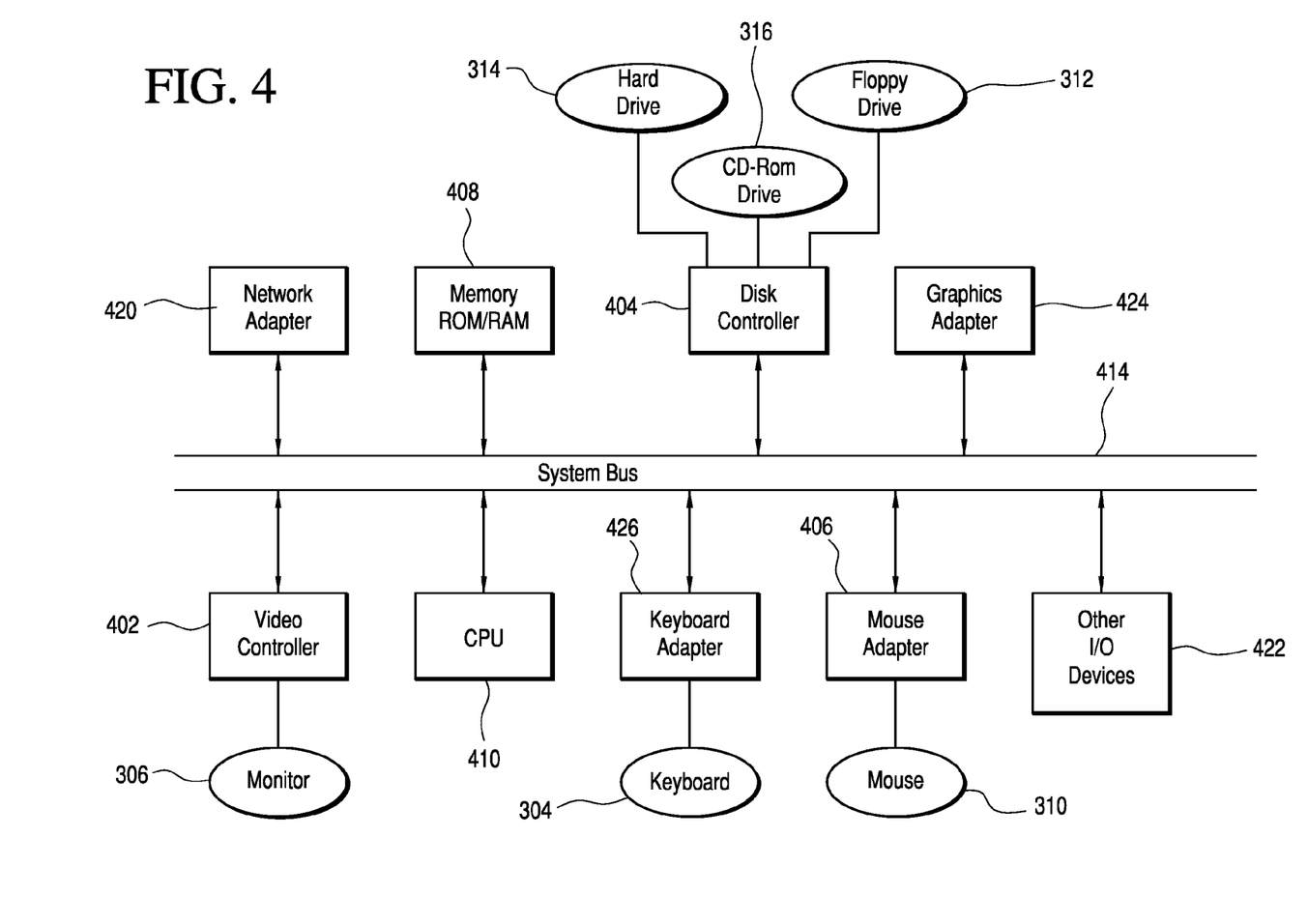
FIG. 4 illustrates a representative block diagram of elements of the computer of FIG. 3.

Data processing mechanism 2500 can be implemented in some examples as a computer. FIG. 3 illustrates a computer 300 that can be suitable for implementing an embodiment of data processing mechanism 2500 (FIG. 2). Computer 300 includes a chassis 302 containing one or more circuit boards (not shown), a floppy drive 312, a Compact Disc Read-Only Memory (CD-ROM) drive 316, and a hard drive 314. In some embodiments, hard drive 314 can comprise part of database 2510 (FIG. 2). A representative block diagram of the elements included on the circuit boards inside chassis 1202 is shown in FIG. 4. A central processing unit (CPU) 410 is coupled to system bus 414 in FIG. 4. There can be embodiments where CPU 410 can comprise a portion of processor 2520 (FIG. 2). In various embodiments, the architecture of CPU 410 can be compliant with any of a variety of commercially distributed architecture families including the RS/6000 family, the Motorola 68000 family, the Intel x86 family, and other families.

System bus 14 is also coupled to memory 408, where memory 408 includes both read only memory (ROM) and random access memory (RAM). Non-volatile portions of memory 408 or the ROM can be encoded with a boot code sequence suitable for restoring computer 300 (FIG. 3) to a functional state after a system reset. In addition, memory 408 can include microcode such as a Basic Input-Output System (BIOS).

In the depicted embodiment of FIG. 4, various I/O devices such as a disk controller 404, a graphics adapter 424, a video controller 402, a keyboard adapter 426, a mouse adapter 406, a network adapter 420, and other I/O devices 422 can be coupled to system bus 414. In some examples, network adapter 420 can be coupled to network 1500 (FIGS. 1-2) to communicatively couple data processing mechanism 2500, embodied in this example as computer 300, with data gathering mechanism sets 1200 and/or 2200. and Keyboard adapter 426 and mouse adapter 406 are coupled to keyboard 304 (FIGS. 3-4) and mouse 310 (FIGS. 3-4), respectively, of computer 300 (FIG. 3). While graphics adapter 424 and video controller 402 are indicated as distinct units in FIG. 4, video controller 402 can be integrated into graphics adapter 424, or vice versa in other embodiments. Video controller 402 is suitable for refreshing monitor 306 (FIGS. 3-4) to display images on a screen 308 (FIG. 3) of computer 300 (FIG. 3). Disk controller 404 can control hard drive 314 (FIGS. 3-4), floppy drive 312 (FIGS. 3-4), and CD-ROM drive 316 (FIGS. 3-4). In other embodiments, distinct units can be used to control each of these devices separately.

Although many other components of computer 300 (FIG. 3) are not shown, such components and their interconnection are well known to those of ordinary skill in the art. Accordingly, further details concerning the construction and composition of computer 300 and the circuit boards inside chassis 302 (FIG. 3) need not be discussed herein.

When computer 300 in FIG. 3 is operated, program instructions stored on a floppy disk in floppy drive 312, on a CD-ROM in CD-ROM drive 316, on hard drive 314, and/or in memory 408 can be executed by CPU 410 (FIG. 4). In some embodiments of the data processing mechanism 2500 of FIG. 2, a portion of the program instructions stored on these devices can be suitable for carrying out the generation, organization, and/or storage of combined data set 2511, and/or the generation of the one or more reports 2530 based on combined data set 2511.

In some embodiments, data processing mechanism 2500 can be implemented as a computer system. The computer system may comprise a single computer, such as computer 300 (FIGS. 3-4), and/or a single server, such as a server comprising one or more components similar to those described for computer 300 but focused on providing access to data for multiple clients, such as clients 2700 in FIG. 2. For example, database 2510 (FIG. 2) can be implemented to comprise one or more storage components that could be similar to hard drive 314 of computer 300 (FIG. 4). Combined data set 2511 (FIG. 2) can be stored in database 2510 as part of an XML (Extensible Markup Language) database, a MySQL database, or an Oracle® database. In the same or different embodiments, the combined data set 2511 (FIG. 2) could consist of a searchable group of individual data files stored in database 2510 (FIG. 2).

There can also be examples where data processing mechanism 2500 comprises more than one computer, and/or a cluster or collection of servers that can be used when the demands by clients 2700 are beyond the reasonable capability of a single server or computer. In many embodiments, the servers in the cluster or collection of servers can be interchangeable from the perspective of clients 2700.

Continuing with the example of FIG. 2, data processing mechanism 2500 is configured to receive operational data sets 1300 and 2300 from data gathering mechanism sets 1200 and 2200, respectively, via network 1500. In some examples, the data gathering, transferring, and/or reception between data gathering mechanism sets 1200 or 2200 and data processing mechanism 2500 can occur in real time. For example, transmitter 1213 (FIG. 1) of data gathering mechanism 1210 may be configured to transmit updated data for operational data set 1300 to data processing mechanism 2500 in real time as agricultural machine 1110 is operated, whether the data is transmitted continuously throughout the operation of agricultural machine 1110, or whether the data is transmitted upon completion of a task or a predefined time interval during the operation of agricultural machine 1110. There can be examples where, when network 1500 is not accessible, data gathering mechanism 1210 can save the data for eventual transmission when network 1500 becomes available. In such examples, the data saved by data gathering mechanism 1210 can also be time-stamped.

Data processing mechanism 2500 can be configured in some embodiments to receive the updated data for operational data set 1300 in real time as soon as cleared through network 1500. Upon receipt of updated data for operational data set 1300, data processing mechanism 2500 can update combined data set 2511 in database 2510 in real time and thereby refresh the data available for reports 2530. As a result, data gathering mechanism can generate reports 2530 based on combined data set 2511, as updated in real time, such that reports 2530 can provide timely and/or current information to clients 2700.

In some embodiments, data processing mechanism 2500 can generate different kinds of reports 2530 for one or more of clients 2700. For example, one of reports 2530 can comprise performance benchmark report 2531 that can be used, for example, to compare the operation or performance of an agricultural machine set against benchmark data from prior historical operations and/or from present or historical data from other agricultural machine sets.

In one example of performance benchmark report 2531, operational data 1310, transmitted by data gathering mechanism 1210 as part of operational data set 1300 during operation of agricultural machine 1110, can comprise one or more subsets of benchmark data, such as a first geographical data set, a first environmental data set, a first yield data set, and/or a first agricultural machine setting data set. In some examples, the first geographical data set can comprise information about the geographical location where agricultural machine 1110 is operated. The first environmental data set can comprise information about environmental conditions during operation of agricultural machine 1110, such as temperature, humidity, and/or seasonal parameters. The first yield data set can comprise information about, for example, the type and yield of a crop being harvested by agricultural machine 1110. The first agricultural machine setting data set can comprise information about agricultural machine settings based on, for example, the operational and/or mechanical parameters previously described with respect to agricultural machine 1110.

To generate the performance benchmark report 2531, data processing mechanism 2500 can be configured to generate a benchmark data set out of combined data set 2511. The benchmark data set may be generated in some embodiments by processor 2520, and can comprise a benchmark geographical data set, a benchmark environmental data set, a benchmark yield data set, and/or a benchmark agricultural machine setting data set. The types of information of the benchmark data set can be similar to the types of information described above for operational data set 1300, but with respect to other operations of agricultural machine 1110, other agricultural machines of agricultural machine set 1100, or other agricultural machine sets.

In some examples, the agricultural machine sets of system 1000 need not be operated by the same entity. For example, in one embodiment, agricultural machine 1110 may be operated by a first farmer or organization, while agricultural machine set 2100 may be operated by a second farmer or organization to the first farmer. The performance benchmark report may be tailored to provide information to the first farmer or organization about present performance compared to past performance, and/or about performance with respect to the performance of the second farmer or company.

In one embodiment, the benchmark data set can comprise historical information derived from operational data set 1300 with respect to performance during prior operations of agricultural machine 1110 and/or of agricultural machine set 1100. In another embodiment, the benchmark data set can comprise present and/or historical comparative information derived from operational data set 2300 with respect to performance during present or past operations of one or more agricultural machines of agricultural machine set 2100. There can also be examples where the benchmark data set is generated at least in part based on information from a predicted performance report or a target performance report. For example, the predicted performance report can comprise a predicted yield report from the U.S. Department of Agriculture (USDA), other governmental sources, or non-governmental sources. As another example, the target performance report can be based on target production figures set by or for the operator of agricultural machine set 1100.

With the benchmark data set established, data processing mechanism 2500 can compare the first geographical data set, the first environmental data set, the first yield data set, and/or the first agricultural machine settings data set against the benchmark geographical data set, the benchmark environmental data set, the benchmark yield data set, and/or the benchmark agricultural machine setting data set. Based on said comparisons, data gathering mechanism can generate performance benchmark report 2531 to comprise a performance assessment of the operation of agricultural machine set 1100 and/or of agricultural machine 1110 relative to the benchmark information. In some examples, the performance assessment can take account of and/or report on a comparative performance summary for different numbers, types, models, brands, and/or configurations of agricultural machines relative to one another with respect to or more one seasons, crops and/or geographies.

There can be examples where data processing mechanism 2500 can be configured to generate machine settings recommendation report 2536. As agricultural machines have become more complex, operators have had to keep track of and fine tune several machine settings, such as those comprised by the first agricultural machine setting data set described above, to maximize performance of their agricultural machines. This can be a complex process, and often requires operators to overcome steep learning curves to properly set and maintain settings for their agricultural machines.

In some embodiments of system 1000, data processing mechanism 2500 can be configured to provide machine settings recommendation report 2536 with one or more recommendations for adjusting one or more machine settings of an agricultural machine. The one or more recommendations can be based, in some examples, on the performance assessment of the operation of agricultural machine set 1100 described above for performance benchmark report 2531. In the same or other examples, the one or more recommendations can be generated based on a machine setting analysis of the first agricultural machine setting data set with respect to at least one of the subsets of the benchmark data set described above. Other aspects of the first operational data set and the benchmark data set can also be considered by data processing mechanism 2500 when generating the recommendations. In some embodiments, machine settings recommendation report 2536 can be part of performance benchmark report 2531.

In one example, where two-way communication exists between data processing mechanism 2500 and data gathering mechanism 1210, data processing mechanism 2500 can be configured to adjust one or more agricultural machine settings of agricultural machine 1110 based on the machine settings analysis described above and/or on the one or more recommendations of the machine settings recommendation report 2536. In the same or other examples, one of performance benchmark report 2531 and/or machine settings recommendation report 2536 can provide a summary comparing the operation of agricultural machine set 1110 before and after implementation of the one or more recommendations described above for machine settings recommendation report 2536.

In some embodiments, data processing mechanism 2500 can generate agricultural machine monitoring report 2532 as one of reports 2530. Agricultural machine monitoring report 2532 can be used, for example, to monitor or keep track of one or more parameters of one or more agricultural machines of an agricultural machine set.

In one example of agricultural machine monitoring report 2532, operational data set 1300 transmitted by data gathering mechanism 1310 can be parsed by data processing mechanism 2500 to generate an agricultural machine parameter set about agricultural machine 1110. In some embodiments, data processing mechanism 2500 parses operational data set 1300 as received from network 1500 during operation of agricultural machine 1110. In other embodiments, data processing mechanism 2500 can parse operational data set 1300 after information from operational data set 1300 has been combined or stored into combined data set 2511. There can be examples where the agricultural machine parameter set can be based on, for example, the operational, mechanical, and/or production parameters previously described with respect to agricultural machine 1110.

In the present example, with the agricultural machine parameter set established, data processing mechanism 2500 can generate agricultural machine monitoring report 2532 to comprise a summary of information from the agricultural machine parameter set for agricultural machine 1110, agricultural machine 2120, and/or agricultural machine set 2100. As an example, the agricultural machine monitoring report 2532 can provide information about current or past settings or operations of agricultural machine 1110, such as a ground speed, an average speed, and/or a harvested area per unit of time. In some examples, agricultural machine monitoring report 2532 can be updated in real time when presented at a screen of an electronic terminal of one or more of the clients 2700.

In the same or other examples, the information in the agricultural machine parameter set can be analyzed to generate information or recommendations regarding one or more maintenance operations for one or more agricultural machines of agricultural machine set 2100. In some embodiments, the maintenance operations could comprise one or more of preventive maintenance operations, scheduled maintenance operations, and/or required maintenance operations for the agricultural machines of agricultural machine set 2100. As an example, data processing mechanism 2500 could be set to recognize and report whether agricultural machine 2110 has been operated nonstop past an allotted limit, such that an operator or equipment change is required, or such that a preventive maintenance should be performed.

There can be examples where the agricultural machine monitoring report can comprise one or more operating recommendations for adjusting at least one of a machine setting or an operating technique of agricultural machine 1110. As an example, the one or more operating recommendations can be based on an analysis of the first agricultural machine parameter set for agricultural machine 1110. In the same or other embodiments, the one or more operating recommendations can be delivered during the operation of agricultural machine 1110.

As a result, the one or more operating recommendations can be received "on the go" by an operator of agricultural machine 1110 to enhance performance or production. In one example, parameters such as grain loss, tailings return, blower fan speed, concave settings, chaffer and sieve settings, and ground speed could be monitored as part of the first agricultural machine parameter set, and could be analyzed to generate the one or more operating recommendations for agricultural machine 1110 such as to improve the volume or quality of grain collected. In another example, parameters such as ground speed, turbo boost pressure, and/or reverser operation could be monitored to identify a current operating condition that could be detrimental to agricultural machine 1110, and could be analyzed to generate the one or more operating recommendations advising a change in operating technique to avoid a mechanical failure of agricultural machine 1110.

Agricultural machine monitoring report 2532 need not be fully automated in some embodiments. For example, in one embodiment, the analyses described above can be fully performed by data processing mechanism 2500. In another embodiment, an analyst of data processing mechanism 2500 may be in contact with an operator of agricultural machine 1110 while agricultural machine 1110 is operated. In such an example, the analyst can review the first agricultural machine parameter set for agricultural machine 1110, and provide the one or more operating recommendations as part of agricultural machine monitoring report 2532. There can be examples where the one or more recommendations provided by the analyst as part of agricultural machine monitoring report 2532 can be voice-based, such as when the analyst and the operator are in contact via telephone or intercom, or visual-based, such as when the recommendations are displayed to the operator via, for example, operation monitor 1211.

In some embodiments, data processing mechanism 2500 can be further coupled to statistically significant data gathering mechanism population 2400, and configured to receive crop production data from population 2400 for at least one of a market or a geographical area. In the same or other embodiments, the crop production data can be processed and/or stored as part of combined data set 2511 (FIG. 2). There can be examples where the population of data gathering mechanisms comprises one of data gathering mechanism set 1200 (FIGS. 1-2) or data gathering mechanism set 2200 (FIG. 2). Data processing mechanism can be configured to generate an aggregated data set based on a macro aggregation of the received crop production data from the population 2400 for the market or the geographical area. In one example, the aggregated data set can comprise information about the operations or performance of one or more agricultural machines for a transcurring timeframe, such as a presently transcurring harvesting season.

The aggregated data set generated by data processing mechanism 2500 can be used to generate several different reports in some embodiments. In one example of such embodiments, data processing mechanism 2500 can be configured to generate historical comparison report 2533 as one of reports 2530. Historical comparison report 2533 can be used to assess performance of an agricultural machine set, such as agricultural machine set 2100, against prior performance of the same agricultural machine set. In some examples, historical comparison report 2533 can take account of different numbers, types, models, brands, and/or configurations of agricultural machines of the agricultural machine set from one season, crop, and/or geography to another.

In one example, when generating historical comparison report 2533 for agricultural machine set 2100, data processing mechanism 2500 can generate a historical aggregated data set by deriving information from combined data set 2511 about one or more historical operations of agricultural machines of agricultural machine set 2100. In the same or other examples, the historical aggregated data set can comprise information about the operations or performance of agricultural machine set 2100 through one or more prior seasons, such as prior harvesting seasons. With the historical aggregated data set generated, data processing mechanism 2500 can compare one or more parameters of the aggregated data set for agricultural machine set 2100 against one or more parameters of the historical aggregated data set for agricultural machine set 2100.

Historical comparison report 2533 can thus comprise a summary of such comparison by data processing mechanism 2500. There can be examples where historical comparison report 2533 can be similar or otherwise comprise aspects of performance benchmark report 2531. In some examples, historical comparison report 2533 can be refreshed as the aggregated data set is updated with new data received by data processing mechanism 2500. In the same or other examples, historical comparison report 2533 can be refreshed in real time.

Data processing mechanism 2500 can also be configured in some embodiments to generate an estimated performance report 2534 using the aggregated data set, where the aggregated data set comprises a yield parameter and a geographical location parameter related to at least a portion of population 2400 of data gathering mechanisms. With such information, data processing mechanism 2500 can be configured to generate estimated performance report 2534 based on the yield parameter and the geographical location parameter such that estimated performance report 2534 can comprise a predicted or estimated yield per geographical location throughout a completion of a predetermined timeframe. In some embodiments, the predetermined timeframe can end, for example, at completion of the presently transcurring harvesting season. In the same or other embodiments, data processing mechanism 2500 can compare the yield and geographical location parameters against yield information for a corresponding geographical location to determine the predicted or estimated yield for estimated performance report 2534. As an example, the yield information for the corresponding geographical location can be based on a yield report from an industry or government organization such as the USDA, and/or from historical yield data derived from combined data set 2511 for the corresponding geographical location.

There can also be examples where data processing mechanism 2500 can be configured to generate an estimated market effect report 2535. In some examples, the estimated market effect report 2535 can be used to forecast the effects of current operations of one or more agricultural machine sets, such as agricultural machine set 2100, on market parameters such as crop prices. In the same or other examples, estimated market effect report 2535 can be derived from the predicted or estimated yield calculated for estimated performance report 2534 above. In such examples, combined data set 2511 can comprise a market conditions set with information such as current market crop prices, current market crop sizes, historical market crop prices, and/or historical market crop sizes. As seen in FIG. 2, there can be examples where data processing mechanism 2500 can be communicatively coupled to market 2600 receive information for the market conditions set. Data gathering mechanism can utilize the predicted or estimated yield for the crop throughout the completion of the predetermined timeframe in order to estimate a predicted crop size for the corresponding geographical location. With the predicted crop size information, data gathering mechanism can compare such predicted crop size with the market conditions set to determine or predict, for example, how the predicted crop size may affect current or future crop prices. A summary of such findings or predictions can then be presented by data processing mechanism 2500 as part of estimated market effect report 2535. In the same or other examples, estimated market effect report 2535 can be updated in real time.

Figure 5:
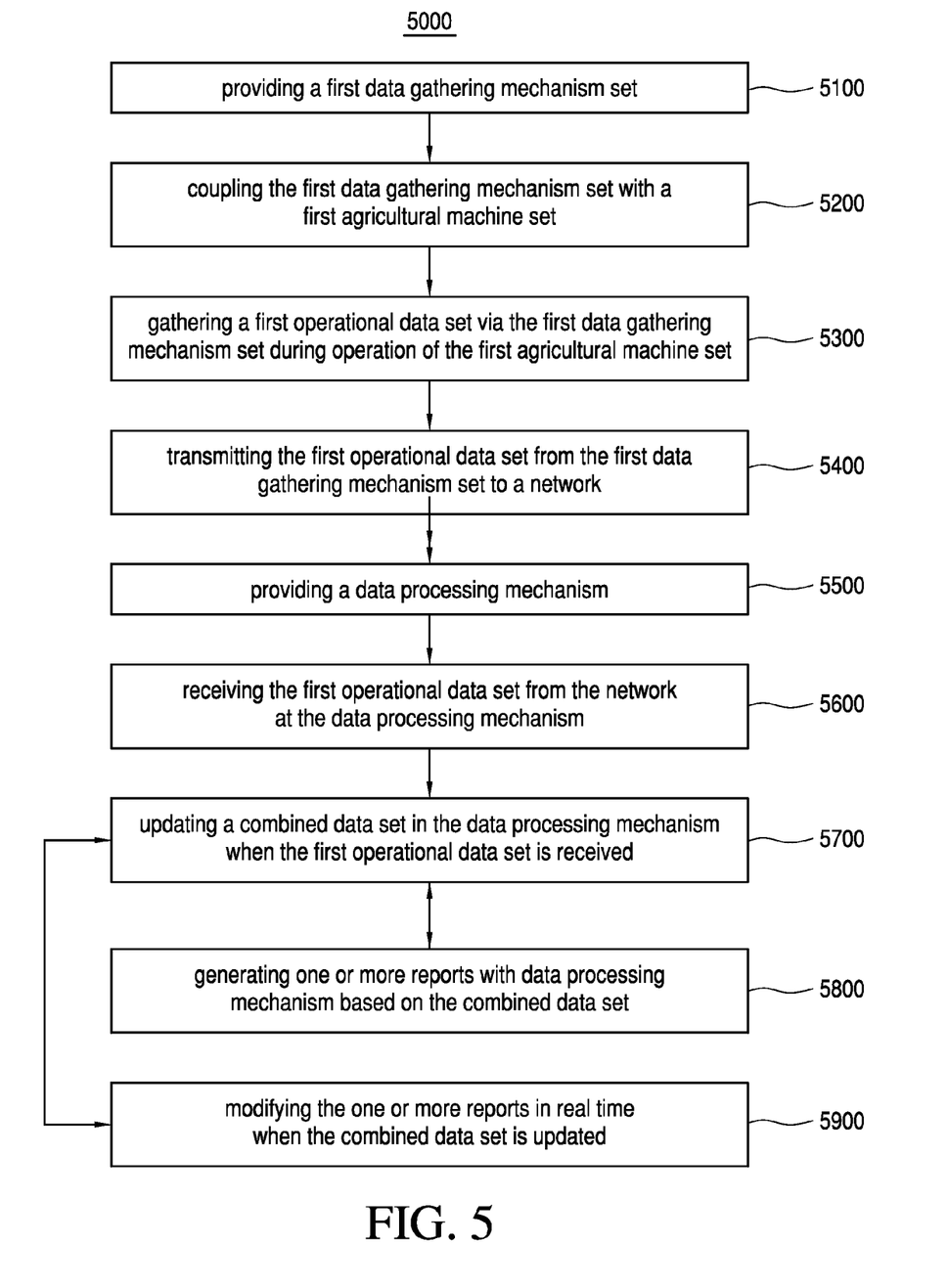
FIG. 5 illustrates a flowchart for a method that can be used for providing an agricultural reporting mechanism.

Continuing with the figures, FIG. 5 illustrates a flowchart for a method 5000 that can be used for providing an agricultural reporting mechanism. In some embodiments, the agricultural reporting mechanism can be similar to system 1000 as described for FIGS. 1-2. Method 5000 is merely exemplary and is not limited to the embodiments presented herein, and can be employed in many different embodiments or examples not specifically depicted or described herein.

Method 5000 comprises block 5100 for providing a first data gathering mechanism set. In some examples, the first data gathering mechanism set of block 5100 can be similar to one of data gathering mechanisms 1200 (FIGS. 1-2), or 2200 (FIG. 2). In some examples, the first data gathering mechanism set can comprise a single data gathering mechanism, as shown in FIG. 2 for data gathering mechanism set 1200 with respect to data gathering mechanism 1210. In other embodiments, the first data gathering mechanism set can comprise a plurality of data gathering mechanisms, as also shown in FIG. 2 for data gathering mechanism set 2200 with respect to data gathering mechanisms 2210 and 2220.

Block 5200 of method 5000 comprises coupling the first data gathering mechanism set of block 5200 with a first agricultural machine set. In some examples, the first agricultural machine set can be similar to one of agricultural machine sets 1100 (FIGS. 1-2) or 2100 (FIG. 2), and could comprise a single agricultural machine or a plurality of agricultural machines. Block 5200 can comprise in some embodiments coupling a first data gathering mechanism of the first data gathering mechanism with a first agricultural machine of the first data gathering mechanism set. In one example, the first agricultural machine can be similar to agricultural machine 1110, and the first data gathering mechanism can be similar to data gathering mechanism 1210 as coupled to agricultural machine 1110 (FIGS. 1-2).

Block 5300 of method 5000 comprises gathering a first operational data set via the first data gathering mechanism set during operation of the first agricultural machine set. There can be embodiments of block 5300 where the first operational data set can be similar to operational data set 1300 from data gathering mechanism 1200 (FIGS. 1-2), or to operational data set 2300 from data gathering mechanism 2200 (FIG. 2). In some examples, the first data gathering mechanism described above can be used to gather first operational data, such as operational data 1310, as part of the first operational data set of block 5300. The first data gathering mechanism can gather the first operational data using elements similar to those described above in FIG. 1 for data gathering mechanism 1210, such as GPS receiver 1212, crop production sensors 1214, and/or operation monitor 1211.

Block 5400 of method 5000 comprises transmitting the first operational data set of block 5300 from the first data gathering mechanism set of block 5200 to a network. There can be embodiments where the first operational data can be transmitted via transmitter 1213 (FIG. 1), as described above for data gathering mechanism 1210 (FIGS. 1-2). In some examples, the network to which the first operational data set is transmitted can be similar to network 1500 (FIGS. 1-2). There can be examples where the first operational data described in block 5300 can be transmitted in real time to the network. For example, the first operational data can be transmitted continuously to the network during the operation of the first agricultural machine. In the same or other examples, the first operational data can be transmitted to the network upon completion of a task during the operation of the first agricultural machine.

Method 5000 also comprises block 5500 for providing a data processing mechanism, where the data processing mechanism can be similar to data processing mechanism 2500 (FIG. 2) in some examples. Providing the data processing mechanism can comprise providing a database such as database 2510 (FIG. 2), and providing a processor such as processor 2520 (FIG. 2) coupled to the database.

Block 5600 of method 5000 comprises receiving the first operational data set of block 5300 from the network at the data processing mechanism of block 5500. In some examples, the data processing mechanism can be coupled to the network via an internet connection. There can also be embodiments where the data processing mechanism of block 5500 and/or the first data gathering mechanism set of block 5100 couple wirelessly to the network, such as through a cellular network interface or a Wi-Fi interface.

Block 5700 of method 5000 comprises updating a combined data set in the data processing mechanism when the first operational data set is received. In some embodiments, the combined data set can be similar to combined data set 2511 in database 2510 of data processing mechanism 2500 (FIG. 2). In the same or other embodiments, the first operational data set can be transformed, modified, analyzed, and/or or otherwise processed by the processor described for block 5500, where the processor can, based on its processing of the first operational data set, control the database to update the combined data set as needed. In the same or other embodiments, the first operational data set can be stored in the database as part of the combined data set after being processed by the processor. There can be examples where the combined data set is updated in real time as the first operational data set keeps being received by the data processing mechanism and/or during the operation of the first agricultural machine set.

Method 5000 also comprises block 5800 for generating one or more reports with the data processing mechanism based on the combined data set. In some examples, the one or more reports of method 5000 can be similar or identical to reports 2530 described above for system 1000, and could be configured for printing or for presentation at a screen of an electronic terminal of one or more of clients 2700 coupled to the data processing mechanism. For example, the one or more reports of block 5800 can comprise a report similar to performance benchmark report 2531 as described above, based on a comparison between benchmark data against information from the first operational data set of block 5300. In the same or other examples, the one or more reports of block 5800 can comprise a report similar to agricultural machine monitoring report 2532 as described above, capable of presenting information regarding a maintenance operation for at least a first agricultural machine of the agricultural machine set of block 5200.

There can also be embodiments where the one or more reports of block 5800 can comprise reports based on an aggregated data set derived from macro aggregation of crop information. For example, the reports based on the aggregated data set can be similar to one or more of historical comparison report 2533, estimated performance report 2534 and/or estimated market effect report 2535 as described above for system 1000.

Block 5900 of method 5000 comprises modifying the one or more reports of block 5800 in real time when the combined data set is updated. As an example, block 5700 may be repeated after block 5800 if the first data gathering mechanism continues transmitting data for the first operational data set to the network per block 5400. Such an arrangement would permit the one or more reports to be updated in real time in some embodiments, such as when the one or more reports are presented at a screen of an electronic terminal. In the same or other embodiments, the macro-aggregation of crop information described above could also be performed in real time by the data processing mechanism to further inform the modification of the one or more reports in block 5900. There can be embodiments of method 5000 where blocks 5900 and 5700 can keep alternating to maintain the one or more reports updated.

In some examples, one or more of the different blocks of method 5000 can be combined into a single block or performed simultaneously, and/or the sequence of such procedures can be changed. For example, blocks 5800 and 5900 can be combined considered part of the same block in some implementations. As another example, block 5500 can be executed before one or more of blocks 5100-5400 in the same or other implementations. There can also be examples where some of the steps of method 5000 can be subdivided into several sub-steps. For example, block 5600 can further comprise the sub-step of processing and/or storing the first operational data set as part of the combined data set in some implementations. There can also be examples where method 5000 can comprise further or different procedures. As an example, method 5000 could comprise another block for coupling the data processing mechanism to a market to receive information related to market conditions. Other variations can be implemented for method 5000 without departing from the scope of the present disclosure.

Although the Agricultural Machine and Operator Performance Information Systems and Related Methods have been described with reference to specific embodiments, various changes may be made without departing from the spirit or scope of the disclosure. For example, one or more of the data gathering mechanisms of data gathering mechanism population 2400 may couple to data processing mechanism 2500 (FIG. 2) via network 1500 via a wired rather than wireless means. Additional examples of such changes have been given in the foregoing description. Accordingly, the disclosure of embodiments is intended to be illustrative of the scope of the invention and is not intended to be limiting. It is intended that the scope of this application shall be limited only to the extent required by the appended claims. The Agricultural Machine and Operator Performance Information Systems and Related Methods discussed herein may be implemented in a variety of embodiments, and the foregoing discussion of certain of these embodiments does not necessarily represent a complete description of all possible embodiments. Rather, the detailed description of the drawings, and the drawings themselves, disclose at least one preferred embodiment, and may disclose alternative embodiments.

All elements claimed in any particular claim are essential to the embodiment claimed in that particular claim. Consequently, replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A method comprising:
    providing a data processing mechanism comprising a database and a processor coupled to the database;
    providing a network device in data communication with the data processing mechanism and a network;
    receiving via the network crop production data in real time after planting and during crop harvesting of present crops from a statistically significant population of data gathering mechanisms of agricultural machines harvesting the present crops throughout multiple harvest fields;
    receiving via the network crop market data comprising information about current crop market conditions after the planting and during the crop harvesting;
    receiving via the network an operational data set from a first agricultural machine of the agricultural machines;
    generating by the data processing mechanism a combined data set in the database in real time as the crop production data and the crop market data are received;
    generating by the data processing mechanism an aggregated data set based on the crop production data from the combined data set,
        the aggregated data set comprising a present yield parameter and a geographical location parameter,
        the geographical location parameter defining a geographical area comprising a plurality of the multiple harvest fields, the present yield parameter based on a macro aggregation of present harvest yields for the present crops of the multiple harvest fields as they are harvested by the statistically significant population of the data gathering mechanisms of the agricultural machines for the geographical area;
    generating by the data processing mechanism reports in real time via the processor, the one or more reports comprising an agricultural machine monitoring report, an estimated performance report, and an estimated market effect report,
    generating the reports comprises:
        generating an agricultural machine monitoring report for the first agricultural machine, comprising:
            parsing the operational data set to generate an agricultural machine parameter set, the agricultural machine parameter set comprising at least one of grain loss, tailings return, blower fan speed, concave settings, chaffer settings, sieve settings, ground speed, turbo boost pressure, or reverser operation; and
            providing summary information from the agricultural machine parameter set;
        generating the estimated performance report based on the aggregated data set generated from the combined data set, the estimated performance report comprising:
            comparing the present yield parameter from the present harvest yields for the present crops of the multiple harvest fields and the geographical location parameter of the multiple harvest fields of the aggregated data set against reference information derived from at least one of a historical yield report, a target yield report, or historical data from the combined data set to generate first comparison data;
            determining an estimated area yield for the geographical area predicted throughout completion of a harvest timeframe for the present crops based on the first comparison data; and
            providing the estimated performance report with the estimated area yield for the geographical area predicted throughout completion of the harvest timeframe for the present crops;
        and
        generating the estimated market effect report based on the aggregated data set generated from the combined data set, the estimated market effect report comprising:
            comparing the information of the crop market data about the current crop market conditions for the present crops during the crop harvesting against the estimated area yield for the geographical area to generate second comparison data;
            determining a predicted market effect summary for an estimated effect that the estimated area yield will have on a crop market price as an output, the predicted market effect summary based the second comparison data; and
            providing the estimated market effect report with the predicted market effect summary for the estimated effect that the estimated area yield will have on the crop market price as an output;
    generating by the data processing mechanism one or more operating recommendations for the first agricultural machine based on a comparison of the agricultural machine parameter set with at least one of one or more benchmarks, one or more maintenance parameters, one or more mechanical parameters, one or more operating parameters, one or more equipment parameters, or one or more production parameters;
    providing the one or more operating recommendations from the data processing mechanism to the first agricultural machine via the network to automatically adjust the first agricultural machine;

and
providing the reports from the data processing mechanism to one or more users via the network,
wherein:
a first portion of the data gathering mechanisms is operated by a first entity comprising a first farmer or a first organization for a first portion of the multiple harvest fields; and
a second portion of the data gathering mechanisms is operated by a second entity different than the first entity comprising a second farmer or a second organization for a second portion of the multiple harvest fields.

2. A system for processing information from first and second data gathering mechanism sets,
the first data gathering mechanism set configured to transmit to a network a first operational data set gathered from and during operation of a first agricultural machine set,
the second data gathering mechanism set configured to transmit to the network a second operational data set gathered from and during operation of a second agricultural machine set,
the system comprising:
a data processing mechanism; and
a network device in data communication with the data processing mechanism and the network,
wherein:
the data processing mechanism is configured to:
receive via the network the first and second operational data sets;
receive via the network an operational data set from a first agricultural machine;
update a combined data set in real time as the first and second operational data sets are received from the network,
the combined data set comprising crop production data received after planting and during crop harvesting of present crops from a plurality of data gathering mechanisms of agricultural machines harvesting the present crops throughout a plurality of harvest fields during the crop harvesting;
generate an aggregated data set based on the crop production data from the combined data set, the aggregated data set comprising:
a geographical location parameter defining a first geographical area comprising first harvest fields of the plurality of harvest fields; and
a present yield parameter based on a macro aggregation of present harvest yields from the crop production data for the present crops of the plurality of harvest fields harvested by the plurality of agricultural machines for the first geographical area;
parse the operational data set to generate an agricultural machine parameter set, the agricultural machine parameter set comprising at least one of grain loss, tailings return, blower fan speed, concave settings, chaffer settings, sieve settings, ground speed, turbo boost pressure, or reverser operation;
generate one or more operating recommendations for the first agricultural machine based on a comparison of the agricultural machine parameter set with at least one of one or more benchmarks, one or more maintenance parameters, one or more mechanical parameters, one or more operating parameters, one or more equipment parameters, or one or more production parameters;
provide the one or more operating recommendations to the first agricultural machine via the network to automatically adjust the first agricultural machine;
generate reports based on the aggregated data set; and
provide the reports to one or more users via the network device;
the data processing mechanism is configured to generate:
an estimated area yield for the first geographical area predicted throughout completion of a harvest timeframe for the present crops and based on the present yield parameter and the geographical location parameter;
the reports comprise an estimated performance report and an estimated market effect report;
the estimated performance report comprises:
the estimated area yield for the first geographical area predicted throughout completion of the harvest timeframe for the present crops based on first comparison data, the first comparison data being generated by comparing the present yield parameter from the present harvest yields for the present crops of the plurality of harvest fields and the geographical location parameter of the plurality of harvest fields of the aggregated data set against reference information derived from at least one of a historical yield report, a target yield report, or historical data from the combined data set; and
the estimated market effect report comprises:
a predicted market effect summary for an estimated effect that the estimated area yield will have on a crop market price as an output, the predicted market effect summary based on a comparison during the crop harvesting between:
crop market data received by the data processing mechanism about crop market conditions for the present crops; and
the estimated area yield for the first geographical area.

3. The system of claim 2, wherein:
the first operational data set is associated with a single agricultural machine of the first agricultural machine set and a single data gathering mechanism of the first data gathering mechanism set.

4. The system of claim 2, wherein:
the first operational data set is transmitted to the network in real time.

5. The system of claim 2, wherein:
the data processing mechanism is configured to:
present at least a first report of the reports at a screen of an electronic terminal; and
update the first report at the screen of the electronic terminal automatically when the combined data set is updated in real time.

6. The system of claim 2, wherein
the data processing mechanism is configured to deliver the reports periodically to the one or more users.

7. The system of claim 2, wherein:
the data processing mechanism is configured to:
present at least a first report of the reports at a screen of an electronic terminal; and
control access to the reports based on a user profile.

8. The system of claim 2, further comprising:
at least one of the first or second data gathering mechanism sets.

9. The system of claim 2, wherein:
the data processing mechanism comprises:
- a database to store the combined data set; and
- a processor coupled to the database to generate the reports based on the combined data set;

and
the data processing mechanism is configured to:
- receive via the network a first operational data related to a first agricultural machine of the first agricultural machine set;
  - the first operational data comprising a portion of the first operational data set;
  - the first operational data comprising:
    - a geographical location of the first agricultural machine; and
    - a first operation monitor information about at least one of:
      - one or more parameters of the first agricultural machine; or
      - a harvesting from a field by the first agricultural machine.

10. The system of claim 9, wherein:
the first operational data is transmitted to the network continuously during the operation of the first agricultural machine.

11. The system of claim 9, wherein:
the first operational data is transmitted to the network upon at least one of:
- a completion of a predetermined time interval; or
- a completion of a task during the operation of the first agricultural machine.

12. The system of claim 2, wherein:
the aggregated data set is derived from information about a presently transcurring timeframe.

13. The system of claim 2, wherein:
the estimated area yield is generated by the data processing mechanism based on a comparison between the present yield parameter and the geographical location parameter from the aggregated data set against yield information derived form at least one of:
- a government organization yield report;
- an industry organization yield report; or
- historical yield data from the combined data set for the first geographical area.

14. The system of claim 13, wherein:
the reports comprise an estimated performance report presenting the estimated area yield for the first geographical area.

15. The system of claim 2, wherein:
the crop market data comprises at least one of:
- current market crop prices; current market crop sizes; historical market crop prices; or historical market crop sizes.

16. A method for processing a first operational data set gathered by a first data gathering mechanism set during operation of a first agricultural machine set and transmitted to a network by the first data gathering mechanism set, the method comprising:
- providing a data processing mechanism;
- providing a network device in data communication with the data processing mechanism and the network;
- receiving the first operational data set from the network at the data processing mechanism via the network;
- receiving an operational data set from a first agricultural machine at the data processing mechanism via the network;
- updating a combined data set in the data processing mechanism in real time as the first operational data set is received,
  - the combined data set comprising crop production data received after planting and during crop harvesting of present crops from a plurality of data gathering mechanisms of agricultural machines harvesting the present crops throughout a plurality of harvest fields;
- generating by the data processing mechanism an aggregated data set based on the crop production data from the combined data set, the aggregated data set comprising:
  - a geographical location parameter defining a first geographical area comprising first harvest fields of the plurality of harvest fields; and
  - a present yield parameter based on a macro aggregation of present harvest yields from the crop production data for the present crops of the plurality of harvest fields harvested by the agricultural machines for the first geographical area;
- parsing by the data processing mechanism the operational data set to generate an agricultural machine parameter set, the agricultural machine parameter set comprising at least one of grain loss, tailings return, blower fan speed, concave settings, chaffer settings, sieve settings, ground speed, turbo boost pressure, or reverser operation;
- generating by the data processing mechanism one or more operating recommendations for the first agricultural machine based on a comparison of the agricultural machine parameter set with at least one of one or more benchmarks, one or more maintenance parameters, one or more mechanical parameters, one or more operating parameters, one or more equipment parameters, or one or more production parameters;
- providing the one or more operating recommendations from the data processing mechanism to the first agricultural machine via the network to automatically adjust the first agricultural machine;
- generating by the data processing mechanism reports with the data processing mechanism based on the aggregated data set;

and
providing the reports from the data processing mechanism to one or more users via the network device,
wherein:
- the data processing mechanism is configured to generate:
  - an estimated area yield for the present crops based on a comparison of the present yield parameter and the geographical location parameter against yield information derived from at least one of a government organization yield report, an industry organization yield report, or historical yield data from the combined data set for the first geographical area;
- the reports comprise an estimated performance report and an estimated market effect report;
- the estimated performance report comprises:
  - the estimated area yield for the present crops; and
- the estimated market effect report comprises:
  - a predicted market effect summary for an estimated effect that the estimated area yield will have on a crop market price as an output, the predicted market effect summary based on a comparison during the crop harvesting between:
    - crop market data received by the data processing mechanism about crop market conditions for the present crops; and the estimated area yield for the first geographical area.

17. The method of claim 16, further comprising:
modifying the reports in real time when the combined data set is updated;
wherein:
    the first operational data set is transmitted to the network in real time during the operation of the first agricultural machine set; and
    the combined data set and the aggregated data set are updated in real time by the data processing mechanism as the first operational data set is received in real time.

18. The method of claim 16, wherein:
the data processing mechanism is configured to:
    present at least a first report of the reports at a screen of an electronic terminal; and
    update the first report at the screen automatically in real time.

19. The method of claim 16, wherein:
providing the data processing mechanism comprises:
    providing a database to store the combined data set;
    providing a processor coupled to the database to generate the reports; and
    configuring the data processing mechanism to:
        receive via the network a first operational data related to a first agricultural machine of the first agricultural machine set,
            the first operational data comprising a portion of the first operational data set; and
        the first operational data comprising:
            a geographical location of the first agricultural machine; and
            a first operation monitor information about at least one of:
                one or more parameters of the first agricultural machine; or
                a harvesting from a field by the first agricultural machine.

20. The method of claim 19, wherein:
the first operational data is at least one of:
    transmitted to the network continuously during the operation of the first agricultural machine; or
    transmitted to the network upon completion of a task during the operation of the first agricultural machine.

21. The method of claim 16, wherein:
generating the reports comprises:
    generating an estimated performance report;
generating the estimated performance report comprises:
    presenting the estimated area yield for the first geographical area as part of the estimated performance report;
and
the crop market data comprises information about at least one of:
    current market crop prices; current market crop sizes;
    historical market crop prices; or historical market crop sizes.

* * * * *